United States Patent Office 3,269,513
Patented August 30, 1966

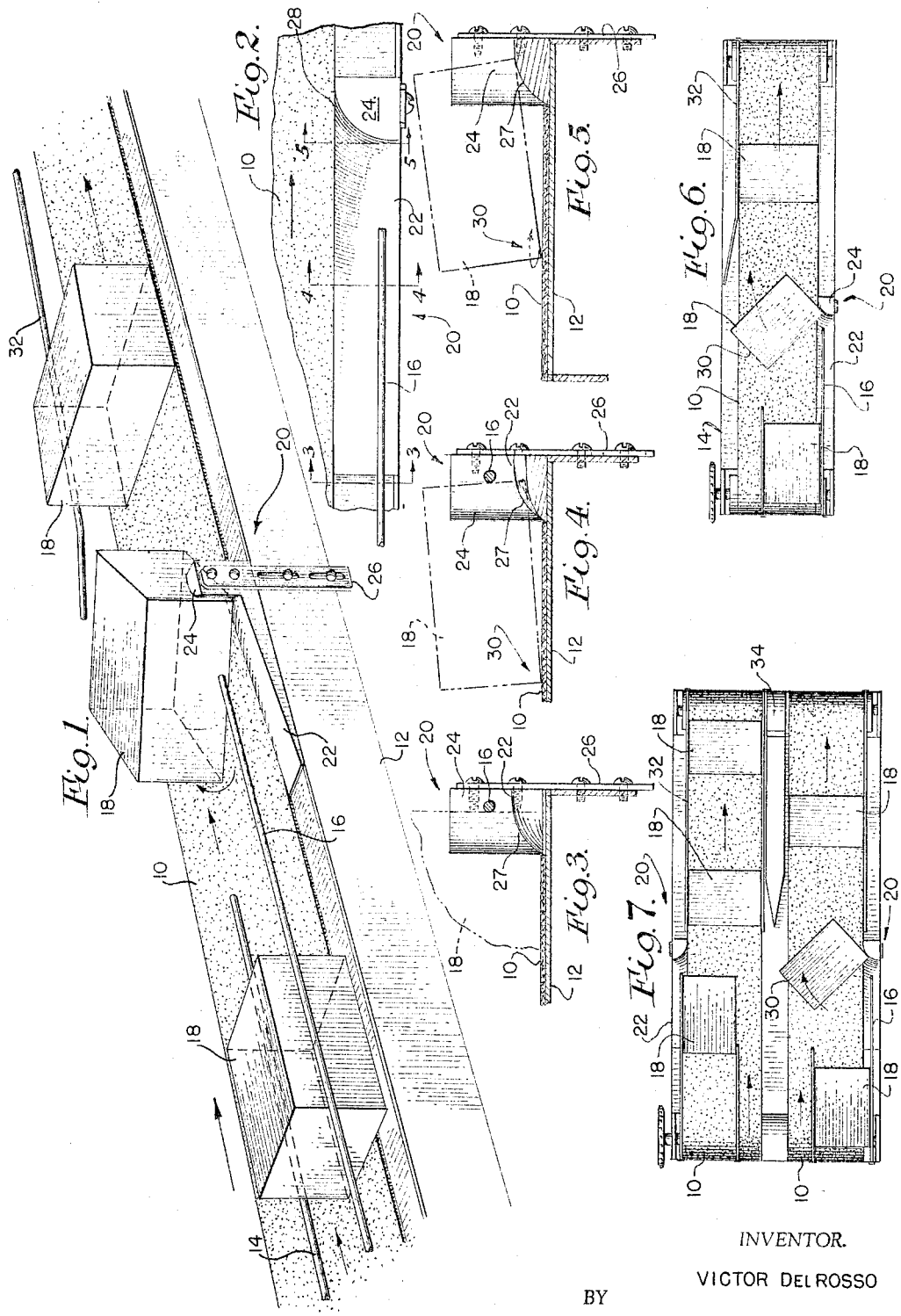

3,269,513
CONVEYING AND TURNING MECHANISM
Victor Del Rosso, Ithaca, N.Y., assignor to Hi-Speed Checkweigher Co., Inc., Ithaca, N.Y.
Filed Mar. 10, 1964, Ser. No. 350,834
3 Claims. (Cl. 198—33)

This invention relates to re-positioning devices in association with conveying mechanisms for merchandise packages, containers, or the like. More particularly, it relates to a combination conveying and re-positioning mechanism for square-shouldered containers, packages, or other such objects; particularly suited for example as in association with present-day high-speed automated packaging and/or delivering operations.

Typically, and by way of example, products of powder or granular form packaged in oblong-shaped containers, and beverage or other liquid containing bottles, are placed in square-shaped cartons following the package and/or bottle filling operation; and as the filled package or carton moves further along the production line (on a conveyor belt or the like) it is sometimes desirable to shift the attitude of the package or carton through a 90 degree turn in plan view, prior to its being conveyed to a subsequent carton-closing, labelling, or other operation in conjunction with further disposition of the package or carton.

Many devices have been previously suggested for turning containers or the like while moving on a conveyor, as explained hereinabove, but such prior devices have been either too elaborate or expensive to install and maintain, or unreliable in performance, in connection with high speed operations, or the like, to be fully satisfactory.

Thus, it is a primary object of the present invention to provide an improved device for automatically turning square-shouldered containers or the like, as they progress on a conveyor, so as to shift the plan view attitude of the container through a 90 degree turn.

Another object of my invention is to provide a device as aforesaid which is capable of the function above described, yet which does not require a deviation in direction of the conveyor after the turning operation.

A further object of my invention is to provide a device as aforesaid which may be most inexpensively constructed and installed and maintained.

Another object of my invention is to provide an improved device as aforesaid which may be expediently adapted for use in conjunction with any conventional conveyor system.

Other objects and advantages of the present invention will become apparent from the following specification and the accompanying drawings, wherein:

FIG. 1 is a fragmentary perspective view of a conventional belt conveyor and a re-positioning mechanism of the present invention in conjunction therewith;

FIG. 2 is a fragmetary top plan view of the re-positioning device shown in FIG. 1;

FIGS. 3, 4, 5 are fragmentary sectional views taken along lines 3—3, 4—4, and 5—5, respectively, of FIG. 2, and showing the progression of a container turning operation;

FIG. 6 is a top plan view of a "single lane" form of the device shown in FIG. 1; and FIG. 7 is a view corresponding to FIG. 6 but showing a "double lane" carton turning device of the invention.

Referring now to FIGS. 1–6, it will be seen that the invention may be embodied by way of example in a device comprising an endless belt type conveyor 10 supported as upon a base plate 12 and training of course around pulleys at opposite ends of the belt (not shown). Guide rails as shown at 14, 16 are provided to keep in line and guide the movements of the containers to be turned as indicated at 18 and as shown at the left hand side of FIG. 1, as they approach the container-turning station of the mechanism.

The container turning device of the present invention is indicated generally at 20 and comprises a unitary cam member such as may be fabricated of wood or plastic or metal parts, or die cast or the like, as may be preferred, to include a vertically inclined ramp portion 22 leading (in the direction of conveyor travel) to a vertically standing post portion 24. As shown in FIGS. 2–7, the ramp and post portions are width-wise coextensive in plan view, and the device may be fixedly mounted, such as for example by means of bracket 26 or the like, to the conveyor support stationary structure so that the cam device stands alongside one edge of the moving conveyor belt 10. Also, the ramp portion 22 is preferably rounded off at its inner side as indicated at 27 (FIGS. 3–5) and the post portion 24 is preferably rounded at its inner side as indicated at 28 (FIG. 2).

The guide rods 14, 16 are disposed so as to align the containers 18 on the conveyor 10 as they approach the turning device, so that the major bottom portions of the containers rest upon the conveyor belt while the outer edges of the containers overhang the edge of the conveyor belt and into directional alignment with the ramp and post portions 22, 24. Thus, as each container reaches the ramp 22 the outer edge thereof slides up upon the ramp. This tilts the container as shown in FIGS. 4, 5 so that it is then supported under its outer edge in elevated, friction-dragging relation by the ramp device; while at its trailing inner corner portion (as indicated at 30, FIGS. 4–6) the container is now supported in freely pivotable relation upon the conveyor belt. Thus, the continued conveyor belt movement initiates a container turning action before the leading outer corner portion of the container meets the post portion 24. Then, when the leading outside corner portion of the container reaches the post 24 it bears against and "wipes" around the latter as the continuing conveyor motion swings the container around the post as illustrated at the center of FIG. 1 and at FIGS. 6, 7. Thus, the container is easily and smoothly rotated through a 90 degree turn in plan view relative to its attitude when initially placed upon the conveyor belt.

It is a particular feature of the present invention that when the outer edge of the container climbs the ramp 22, the container progressively tilts upwardly and inwardly (as viewed endwise of the conveyor) so that it remains in friction-driving contact with the conveyor belt only at the inner trailing edge bottom corner portion of the container, whereby the conveyor thereupon continues to draw the inner side of the container forwardly while the outer side of the container is being frictionally restrained from advancement, by reason of its frictional engagement upon the stationary ramp 22. Hence, the ramp arrangement initiates the container turning action, and the post portion subsequently operates only to finalize the action and to guide the container to finally slide around and then drop into properly aligned position on the conveyor as it passes on, as shown at the right hand end portion of FIGS. 1, 6, 7. Thus, the mechanism of the invention minimizes the deceleration-acceleration effects acting on the container as it is being turned and then freed for carrying away by the conveyor; and the system is capable of markedly improved and smooth operation in association with higher conveyor speeds. Guide rails as shown at 32 may be employed if desired to insure properly guided travel of the containers as they leave the turning station and travel towards the discharge end of the belt. FIG. 7 illustrates how a double lane system may be conveniently established through use of either one or two conveyor belts with turning devices of the invention located at opposite sides, and a suitable guide barrier therebetween as indicated at 34.

It will be noted that the same conveyor, with no change in breadth or deviation in direction may be utilized throughout the entire operation. This is an important factor, not only in that a less complex and expensive mechanism is employed; but also in that a considerable amount of space is saved. It will of course be appreciated that the device as above described may be employed in the handling of any square or oblong-shaped or other square-shouldered containers; and that in accordance with this invention a structurally simple and rugged and yet most efficient means employing no moving parts, for turning containers on a fast moving conveyor is provided. Furthermore, it will be seen that the mechanism may be installed in connection with any endless conveyor type system, without alteration of the conveyor per se. The system avoids the imposition of any abrupt stop-start movements of the container being turned; thereby avoiding any possibility of production line jams, and/or undesirable intermittent loads on the conveyor drive system. The length and angular forms of the ramp and post portions will of course be made to suit any prescribed carton size and weight and speed of conveyor operation.

It will of course be understood that the invention is not limited to the exact details of construction shown and described hereinabove, and that modifications may be made therein without departing from the spirit of the invention or the scope of the following claims.

I claim:

1. In a conveying and repositioning mechanism for square-shouldered boxes comprising, an endless platform type conveyor for carrying the boxes, and means for rotating said boxes relative to said conveyor through a 90 degree attitude turn, said means for rotating said boxes comprising a stationary cam device located alongside said conveyor, said cam device including an inclined ramp portion having its upper surface at one end disposed at an elevation below that of the top surface of said conveyor and inclining upwardly therefrom toward the opposite end of the ramp portion to an elevation substantially above said conveyor and an upstanding abutment portion at said opposite end of the ramp portion, said ramp portion having a length which is a substantial portion of a box dimension providing at least a line contact therewith, means guiding the boxes to travel with said conveyor while extending at their edges to overhang said conveyor and to move in directional alignment with said ramp and abutment portions, said ramp portion maintaining the outer edge of each said boxes in elevated and inclined relation as they ride thereupon in frictional-dragging relation whereby only the inner trailing corner portion of the box remains in frictionally driven and vertically supported relation with said conveyor and said box is thereby caused to start to rotate as seen in plan view and whereby when the trailing outside corner portion of said box moves into bearing relation against said abutment portion the latter forces said box to complete a 90 degree turning operation and to thereupon fall flatly upon said conveyor.

2. A mechanism for conveying and repositioning a train of objects comprising, a platform type conveyor for carrying the objects, and means for rotating said objects in plan view relative to said conveyor through 90 degree attitude turns, said means for rotating said objects comprising a stationary cam device located alongside said conveyor, said cam device including an elongate inclined ramp portion having its upper surface at one end disposed at an elevation below that of the top surface of said conveyor and inclining upwardly therefrom toward the opposite end of the ramp portion to an elevation substantially above said conveyor and an upstanding abutment portion at said opposite end of the ramp portion, means guiding the objects to travel with said conveyor as they approach said cam device while extending at their edges to overhang said conveyor and to move in directional alignment with said ramp portion, said ramp portion being thereby operative to elevate the outer edge only of each of said objects as they ride thereupon in frictional-dragging relation thereon whereby only inner trailing corner portions of said objects remain in frictionally driven relation with said conveyor, and whereby said objects are thereby caused to start to rotate as seen in plan view when the outer edge portions thereof mount said ramp, said upper surface of the ramp portion being transversely convex to slope toward said conveyor to facilitate turning of said objects while in contact with said ramp and sliding off therefrom to subsequently fall flatly upon said conveyor, and whereby when the trailing outsisde corner portions of said objects move into bearing relation against said abutment portion the latter forces said objects to complete 90 degree turning operations and thereupon to fall flatly upon said conveyor.

3. The mechanism as defined in and by claim 2 wherein said upstanding abutment portion of the cam device is provided with a convex vertical abutment surface which slopes away from said opposite end of the ramp portion along the direction of movement of said conveyor.

References Cited by the Examiner

UNITED STATES PATENTS 2,664,816   1/1954   Gibson _____ 198—33

EVON C. BLUNK, *Primary Examiner.*

EDWARD A. SROKA, SAMUEL F. COLEMAN,
*Examiners.*